(12) United States Patent
Jacob

(10) Patent No.: US 6,217,456 B1
(45) Date of Patent: Apr. 17, 2001

(54) TELESCOPIC SHAFT

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/451,977

(22) Filed: Nov. 30, 1999

(30) Foreign Application Priority Data

Dec. 5, 1998 (DE) .............................. 198 56 190

(51) Int. Cl.$^7$ ................................... F16C 3/035
(52) U.S. Cl. ..................... 464/167; 464/906; 464/146
(58) Field of Search ..................... 464/139, 141, 464/143, 145, 146, 162, 167, 183, 178, 906

(56) References Cited

U.S. PATENT DOCUMENTS

| | | | |
|---|---|---|---|
| 3,203,202 | * | 8/1965 | Brownyer ............... 464/167 |
| 3,808,839 | | 5/1974 | Teramachi . |
| 4,103,514 | * | 8/1978 | Grosse-Entrup ............... 464/167 |
| 4,254,639 | * | 3/1981 | Teramachi ............... 464/167 |
| 4,764,154 | * | 8/1988 | Teramachi ............... 464/168 |
| 5,611,733 | | 3/1997 | Jacob et al. . |
| 5,624,318 | | 4/1997 | Jacob . |

FOREIGN PATENT DOCUMENTS

| | | |
|---|---|---|
| 44 19 341 C1 | 6/1994 | (DE) . |
| 44 19 373 C2 | 6/1994 | (DE) . |
| 197 39 934 A1 | 9/1997 | (DE) . |
| 1 292 557 | 7/1971 | (GB) . |
| 2 311 117 | 10/1997 | (GB) . |

\* cited by examiner

*Primary Examiner*—Lynne H. Browne
*Assistant Examiner*—Kenn Thompson

(57) ABSTRACT

The invention relates to a telescopic shaft as used, for example, in a connecting shaft between two joints of a driveshaft. The telescopic shaft comprises an outer part (6) and an inner part (12) and a cage (15) arranged therebetween. In the inner face of the outer part (6), there are arranged outer running grooves (10) which extend parallel to the longitudinal axis (5). In the inner part (12) entering the outer part (6) there are provided circumferentially distributed inner running grooves (14). The number of outer running grooves (10) is two or three times the number of inner running groves, so that the outer part (6) comprises more advantageous cross-sectional conditions for hardening operations. Hardness distortions are reduced so that the required functional play values for the opposed outer running grooves (10) and inner running grooves (14) can be accommodated and observed by means of balls (17) guided by a cage (15). The balls (17) permit a relative adjustment of the outer part (6) relative to the inner part (12) and a transmission of torque therebetween.

6 Claims, 2 Drawing Sheets

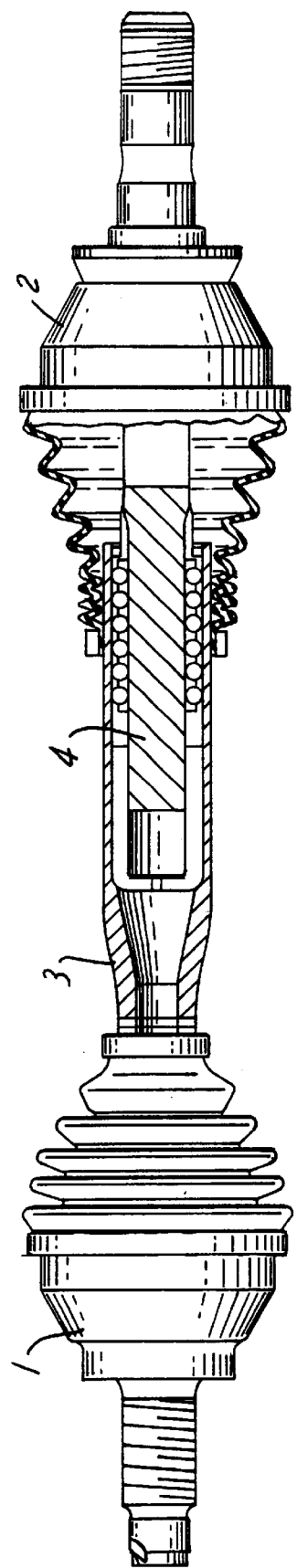
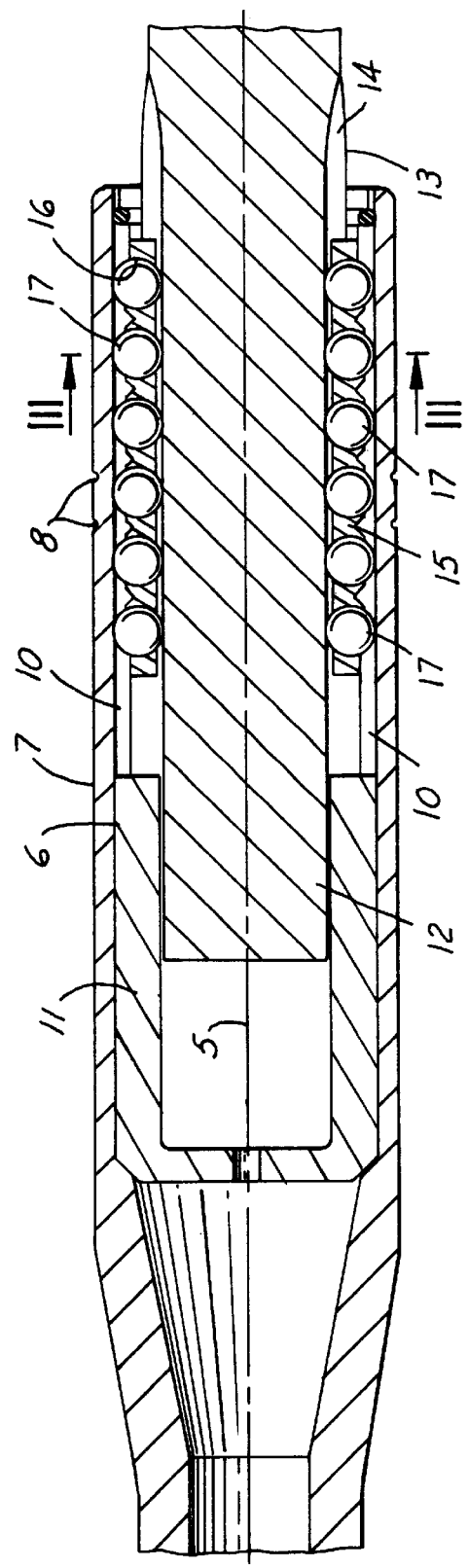
FIG.1
FIG.2

TELESCOPIC SHAFT

BACKGROUND OF THE INVENTION

The invention relates to a telescopic shaft, for connecting two joints. In particular, a telescopic shaft comprising an outer part and an inner part which are provided with running grooves of which two are arranged opposite one another and which receive balls for the purpose of axially adjusting the two parts relative to one another and for transmitting torque between the two parts.

U.S. Pat. No. 5,624,318 describes a driveshaft connecting two constant velocity joints into which there is integrated a telescopic shaft or a telescopic shaft portion which compensates for any changes in length occurring when the joint angles are changed. The telescopic shaft comprises an outer part in the form of a sleeve and an inner part in the form of a shaft portion. The inner part adjustably enters a bore of the outer part in the direction of the common longitudinal axis of both parts. In the bore of the outer part there are provided circumferentially distributed outer running grooves which extend parallel to the longitudinal axis. In the outer face of the inner part there are provided inner running grooves which are arranged opposite the outer running grooves. The outer running grooves and inner running grooves are distributed around the longitudinal axis at identical pitches. Each pair of inner running grooves and outer running grooves accommodates a plurality of balls which serve to transmit torque and which together, form an anti-friction bearing for adjusting the outer part and inner part relative to one another in the direction of the longitudinal axis.

For designing a telescopic shaft or telescopic shaft portion, the inner part constitutes the part which determines the pitch of the inner running grooves and the size and number of the balls, taking into account the torque values to be transmitted and the peak loads occurring in a predetermined application, for example in the driveshaft of a motor vehicle. The pitch for the outer running grooves in the bore of the outer part is thus also determined. However, as the outer running grooves are arranged on a larger diameter than the inner running grooves, there occur webs between each two outer running grooves in which, due to the greater circumferential distance of the outer running grooves, there are accumulated larger material masses than between inner running grooves of the inner part which closely adjoin one another in the circumferential direction. For the outer part this means that the disadvantageous distribution results in distortion during hardening. This distortion necessitates subsequent machining. Rough tolerances cannot be admitted because any rotational play or any resistance against displacement changing along the path of adjustment is not acceptable as it adversely affects functioning. Subsequent machining increases costs.

SUMMARY OF THE INVENTION

It is an object of the invention to provide a telescopic shaft which is designed in such a way that distortion cannot occur during hardening, or that any distortion that does occur is minimized to such an extent that the required functional clearances are ensured without the need for subsequent machining. The telescopic shaft can also be produced cost-effectively.

In accordance with the invention, this and other objects and advantages are achieved by providing a telescopic shaft having an outer part which comprises a longitudinal axis, a bore centered on the longitudinal axis, an even number of outer running grooves which are uniformly distributed around the longitudinal axis and which are arranged in the wall of the bore so as to extend parallel to the longitudinal axis. The outer part is provided with a circular-cylindrical outer face in the length portion comprising the outer running grooves. The telescopic shaft further includes an inner part which enters the bore of the outer part, whose longitudinal axis, in the assembled condition, coincides with that of the outer part. The outer face of the inner part comprises inner running grooves which are uniformly distributed around the longitudinal axis and extend parallel thereto. The number of inner running grooves corresponds to half, or a third of, the number of outer running grooves, with each of the inner running grooves being arranged opposite each second or third circumferentially distributed outer running groove, thus forming pairs. The telescopic shaft also includes balls, a plurality of which are rollingly arranged in each pair of opposed outer running grooves and inner running grooves.

An advantage of the present invention is that, due to the negligible differences in wall thickness, i.e. due to a more even distribution of masses and the symmetrical design, practically no distortion occurs during hardening. As a result, there is no need for subsequent machining. In addition, the outer part is more lightweight, so that the masses to be accelerated and decelerated are smaller.

Note that the outer part is provided with outer running grooves whose number can be divided by 3 and/or 2 and results in an integral figure of inner running grooves.

According to a preferred embodiment, a cage, which is sleeve-like, is arranged between the outer face of the inner part and the wall of the bore of the outer part. The cage comprises radial through-holes in which the balls are received and from which they project inwardly and outwardly for the purpose of engaging the pair-forming outer running grooves and inner running grooves.

Particularly advantageous conditions are obtained if the outer part with the outer running grooves is produced by round form-kneading, or rotary swaging starting from a tube and using an inner tool which comprises the inner contour of the outer part. Producing the outer part by a non-chip forming method leads to good surfaces and makes it possible to observe close tolerances and achieve a high degree of repeat accuracy. In addition, there is achieved an advantageous structure and reduction in production costs.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be made to the embodiments illustrated in the accompanying drawings and described below by way of examples of the invention. In the drawings:

FIG. 1 shows a schematic drawing of a driveshaft with two constant velocity joints at its ends and a connecting shaft including a telescopic shaft portion according to one embodiment of the present invention.

FIG. 2 shows the telescopic shaft portion of FIG. 1 in an enlarged scale in a longitudinal section.

DETAILED DESCRIPTION OF A PREFERRED EMBODIMENT

Figure 3:
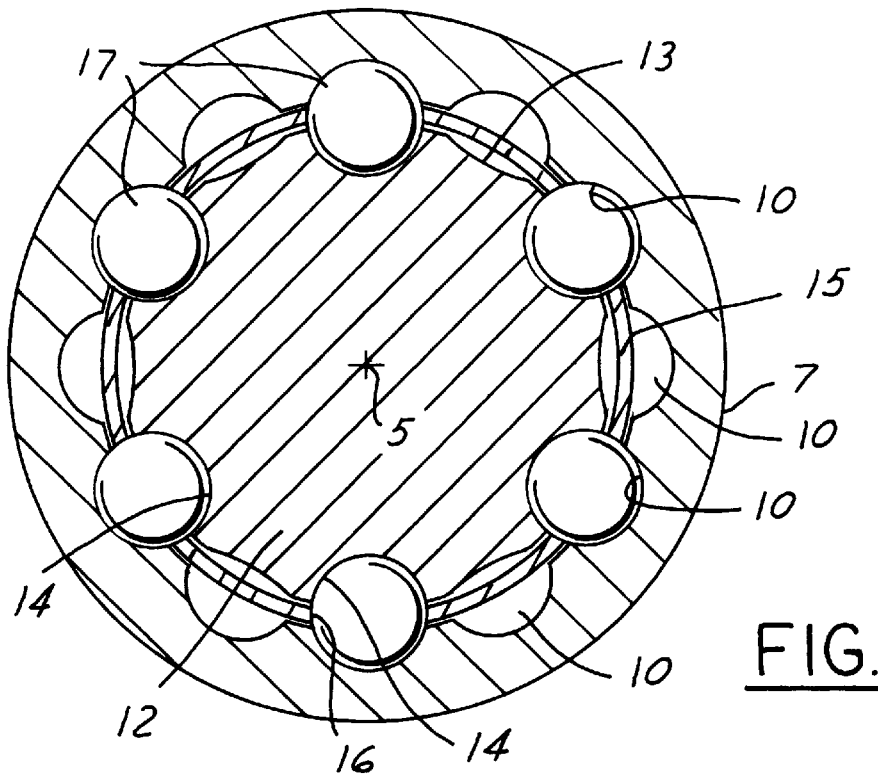
FIG. 3 is a cross-section along sectional line II—II of FIG. 2 in yet a larger scale.

FIG. 1 shows a propeller shaft having a first joint 1, a second joint 2 and a connecting shaft 3 which connects the two joints 1 and 2 for torque transmitting purposes. A telescopic shaft 4 in the form of a connecting shaft portion is integrated into the connecting shaft 3. The driveshaft illustrated in FIG. 1 serves as a sideshaft, for example, for driving the wheels of a passenger car and connects the differential drive to the wheel. The changes in position occurring during compression and rebound of the wheels lead to changes in the angle of articulation of the joints 1 and 2. This also leads to a change in the distance between the articulation centers of the two joints 1 and 2, which changes are compensated for by the telescopic shaft which permits changes in length and also be able to transmit torque.

However, the invention can also be applied to driveshaft embodiments other than that illustrated. For example, the telescopic shaft can be used in driveshafts whose joints are not constant velocity joints, but universal joints. The telescopic shaft 4 in accordance with an embodiment of the invention will be described in greater detail below with reference to FIGS. 2 and 3.

The telescopic shaft 4 comprises an outer part 6 which, for example, by means of a connected tube or a corresponding length design, can be connected to one of the two joints according to FIG. 1. The longitudinal axis of the outer part 6 and of the entire telescopic shaft 4, respectively, has been given the reference number 5. The outer part 6 comprises a portion which is provided with a bore 9 which is centered on the longitudinal axis 5 and in whose wall, there are arranged circumferentially distributed outer running grooves 10 which extend parallel to the longitudinal axis 5. As can be seen in FIG. 3, there are provided twelve such outer running grooves 10 in total, whose cross-section represents a curve-shaped indentation. The outer running grooves 10 are uniformly distributed around the longitudinal axis 5. The outer face 7 of the outer part 6 is substantially circular-cylindrical. There can be provided one or several indentations in the form of annular grooves 8 which serve to fix a convoluted boot, for example. The outer part 6 is produced by rotary swaging, using an inner tool comprising the contour of the outer running grooves 10 and the webs arranged therebetween. Rotary swaging is a process by which the diameter of a tube is reduced by radial forces and its inner profile is made to conform to an inner tool. Rotary swaging, starting from a tube, achieves, by simple methods, a high degree of dimensional accuracy in a non-chip-forming way. This results in an advantageous structure.

Into the bore 9 of the outer part, there is introduced an insert 11 which delimits the portion provided with outer running grooves 10 relative to the tubular portion.

An inner part 12 whose longitudinal axis 5, in the assembled condition, coincides with the longitudinal axis of the outer part 6, is contained within the bore 9. In the outer face 13 of the inner part 12, there are arranged circumferentially distributed inner running grooves 14 which extend parallel relative to the longitudinal axis 5. The inner part 12 is a solid part, but it can also be provided in the form of a hollow journal, and is connected in a rotationally fast way to one of the joints according to FIG. 1, for example.

Figure 4:
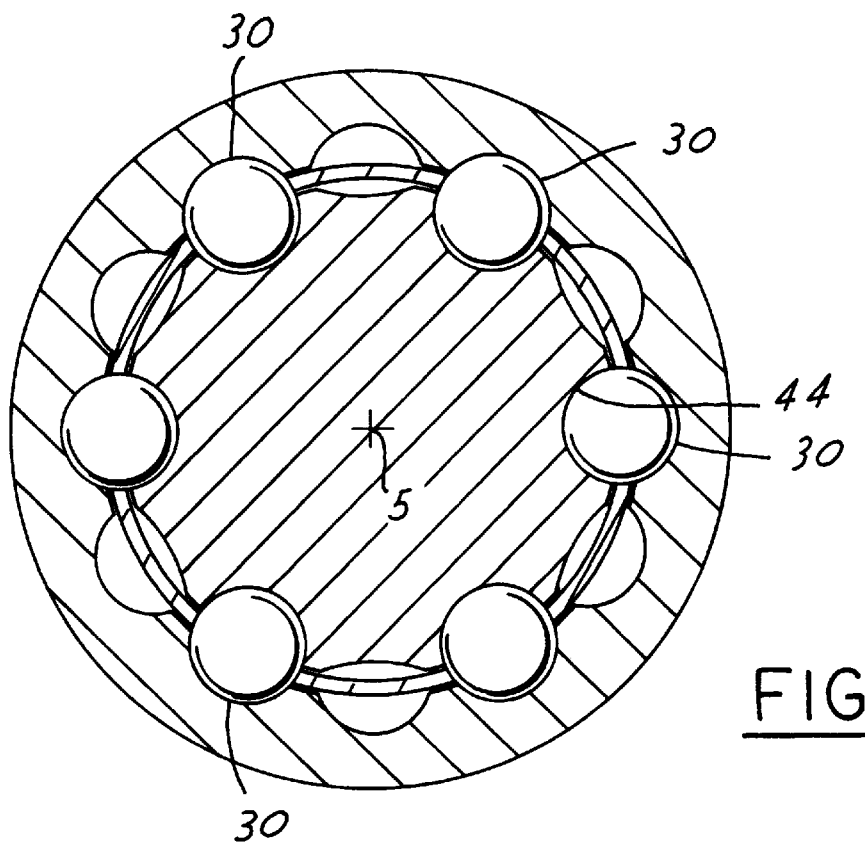
FIG. 4 is a cross-section view similar to FIG. 3, showing an alternative arrangement of balls and grooves.

Whereas the outer part 6 comprises a total of twelve outer running grooves 10, the inner part 12 is provided with only six inner running grooves 14, i.e. half the number of outer running grooves 10. However, depending on the amount of torque to be transmitted, the inner part 12 can also comprise only four inner running grooves, which corresponds to one third of the number of outer running grooves 10. In such an embodiment, only four balls 30 and corresponding inner running grooves 44 would be required. This is shown in FIG. 4. Referring again to FIG. 3, the inner running grooves 14 are uniformly distributed in the outer face 13, so that one inner running groove 14 is positioned opposite an outer running groove 10, with the opposed inner running grooves 14 and outer running grooves 10 forming a pair. One or two further outer running grooves 10 are positioned opposite the outer face 13 of the inner part in the region between each two subsequent inner running grooves.

In the radial space between the outer face 13 of the inner part 12 and the wall of the bore 9 of the outer part 6, there is arranged a sleeve-shaped cage 15. The cage 15 in accordance with the pairs of inner running grooves 14 and outer running grooves 10, is provided with a plurality of circumferentially distributed through-holes 16 which are offset along the longitudinal axis 5. The through-holes 16 serve to receive balls 17 which project radially inwardly and outwardly from through-holes 16 and which engage a pair of inner running grooves 14 and outer running grooves 10. FIG. 3 shows that, in consequence, only every other outer running groove 10 is occupied by balls 17. This leads to a more even distribution of masses in the outer part 6, so that, after the outer running grooves 10 have been hardened in the outer part 6, there occurs practically no distortion and that the functionally required tolerances can be observed.

From the foregoing, it can be seen that there has been brought tot the art a new and improved telescopic shaft which has advantages over conventional telescopic shafts. While the invention has been described with reference to one or more embodiments, it is not intended to be limited thereto. Rather, the invention covers all alterations, modifications and equivalents as may be included within the spirit and scope of the appended claims.

What is claimed is:

1. A telescopic shaft for connecting a driveshaft comprising:
   an outer part (6) which comprises a longitudinal axis (5), a bore (9) centered on the longitudinal axis (5), a plurality of outer running grooves (10 which are uniformly distributed around the longitudinal axis (5) and which are arranged in the wall of the bore (9) so as to extend parallel to the longitudinal axis (5), the outer part (6) being provided with a circular-cylindrical outer face (7) in the length portion comprising the outer running grooves (10);
   an inner part (12) within the bore (9) of the outer part (6), the inner part comprising a longitudinal axis (5) which, in the assembled condition, coincides with that of the outer part (6), an outer face (13), comprising inner running grooves (14) which are uniformly distributed around the longitudinal axis (5) and extend parallel thereto and whose number corresponds to one half the number of outer running grooves (10), with each of the inner running grooves (14) being arranged opposite each second circumferentially distributed outer running groove (10), thus forming pairs; and
   a plurality of balls (17) at least one of which is rollingly arranged in each pair of opposed outer running grooves (10) and inner running grooves (14).

2. A telescopic shaft according to claim 1, further comprising a cage (15), which is sleeve-like, arranged between the outer face (13) of the inner part (12) and the wall of the bore (9) of the outer part (6), the cage (15) comprising radial through-holes (16) in which the balls (17) are received and from which the balls (17) project inwardly and outwardly for the purpose of engaging the pair-forming outer running grooves (10) and inner running grooves (14).

3. A telescopic shaft according to claim 1, wherein:

the outer part (6) with the outer running grooves (10) is produced by rotary swaging, starting from a tube and using an inner tool which comprises the inner contour of the outer part (6).

4. A telescopic shaft for connecting a driveshaft comprising:

an outer part (6) which comprises a longitudinal axis (5), a bore (9) centered on the longitudinal axis (5), a plurality of outer running grooves (10 which are uniformly distributed around the longitudinal axis (5) and which are arranged in the wall of the bore (9) so as to extend parallel to the longitudinal axis (5), the outer part (6) being provided with a circular-cylindrical outer face (7) in the length portion comprising the outer running grooves (10);

an inner part (12) within the bore (9) of the outer part (6), the inner part comprising a longitudinal axis (5) which, in the assembled condition, coincides with that of the outer part (6), an outer face (13), comprising inner running grooves (14) which are uniformly distributed around the longitudinal axis (5) and extend parallel thereto and whose number corresponds to one third the number of outer running grooves (10), with each of the inner running grooves (14) being arranged opposite each third circumferentially distributed outer running groove (10), thus forming pairs; and a plurality of balls (17) at least one of which is rollingly arranged in each pair of opposed outer running grooves (10) and inner running grooves (14).

5. A telescopic shaft according to claim 4, further comprising a cage (15), which is sleeve-like, arranged between the outer face (13) of the inner part (12) and the wall of the bore (9) of the outer part (6), the cage (15) comprising radial through-holes (16) in which the balls (17) are received and from which the balls (17) project inwardly and outwardly for the purpose of engaging the pair-forming outer running grooves (10) and inner running grooves (14).

6. A telescopic shaft according to claim 4, wherein:

the outer part (6) with the outer running grooves (10) is produced by rotary swaging, starting from a tube and using an inner tool which comprises the inner contour of the outer part (6).

* * * * *